United States Patent
Schevciw et al.

(10) Patent No.: US 9,769,587 B2
(45) Date of Patent: Sep. 19, 2017

(54) CALIBRATION OF ACOUSTIC ECHO CANCELATION FOR MULTI-CHANNEL SOUND IN DYNAMIC ACOUSTIC ENVIRONMENTS

(71) Applicant: QUALCOMM Incorporated, San Diego, CA (US)

(72) Inventors: Andre Gustavo Schevciw, San Diego, CA (US); Babak Forutanpour, Carlsbad, CA (US); Asif Iqbal Mohammad, San Diego, CA (US); Lae-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 14/690,059

(22) Filed: Apr. 17, 2015

(65) Prior Publication Data

US 2016/0309275 A1    Oct. 20, 2016

(51) Int. Cl.
H04R 5/02    (2006.01)
H04S 7/00    (2006.01)
(Continued)

(52) U.S. Cl.
CPC .............. *H04S 7/301* (2013.01); *G10K 11/16* (2013.01); *H04R 5/04* (2013.01); *H04R 2499/13* (2013.01); *H04S 2400/09* (2013.01)

(58) Field of Classification Search
CPC ........ H04R 25/00; H04R 5/00; H04R 29/005; H04R 1/08; H04R 3/002; H04R 5/02;
(Continued)

(56) References Cited

U.S. PATENT DOCUMENTS 5,146,507 A    9/1992    Satoh et al.
9,497,544 B2    11/2016   Mohammad et al.
(Continued)

FOREIGN PATENT DOCUMENTS

DE    102009022685 A1    12/2010
EP    2172058 A1    4/2010
(Continued)

OTHER PUBLICATIONS

International Search Report and Written Opinion from International Application No. PCT/US2016/020282, dated May 25, 2016, 13 pp.
(Continued)

*Primary Examiner* — Vivian Chin
*Assistant Examiner* — Ubachukwu Odunukwe
(74) *Attorney, Agent, or Firm* — Shumaker & Sieffert, P.A.

(57) ABSTRACT

A multi-channel sound (MCS) system features intelligent calibration (e.g., of acoustic echo cancellation (AEC)) for use in dynamic acoustic environments. A sensor subsystem is utilized to detect and identify changes in the acoustic environment and determine a "scene" corresponding to the resulting acoustic characteristics for that environment. This detected scene is compared to predetermined scenes corresponding to the acoustic environment. Each predetermined scene has a corresponding pre-tuned filter configuration for optimal AEC performance. Based on the results of the comparison, the pre-tuned filter configuration corresponding to the predetermined scene that most closely matches the detected scene is utilized by the AEC subsystem of the multi-channel sound system.

24 Claims, 8 Drawing Sheets

(51) Int. Cl.
*G10K 11/16* (2006.01)
*H04R 5/04* (2006.01)

(58) Field of Classification Search
CPC ....... H04R 5/04; H04R 2499/13; H04S 7/303; H04S 5/00; H04S 7/301; H04S 2400/09; G10K 11/16
USPC ..... 381/1, 150, 17, 303, 300, 71.8; 367/138; 370/464
See application file for complete search history.

(56) References Cited

U.S. PATENT DOCUMENTS

| | | | |
|---|---|---|---|
| 2007/0280486 A1 | 12/2007 | Buck et al. | |
| 2007/0286230 A1* | 12/2007 | Basu | H04B 3/234 370/464 |
| 2008/0130923 A1 | 6/2008 | Freeman | |
| 2008/0285772 A1* | 11/2008 | Haulick | G01S 7/52003 381/92 |
| 2010/0329489 A1 | 12/2010 | Karaoguz | |
| 2011/0317522 A1* | 12/2011 | Florencio | G01S 3/8006 367/129 |
| 2012/0093320 A1* | 4/2012 | Flaks | A63F 13/54 3/54 |
| 2012/0185769 A1 | 7/2012 | Whitley | |
| 2014/0121009 A1 | 5/2014 | Watson | |
| 2014/0328490 A1 | 11/2014 | Mohammad et al. | |
| 2015/0036848 A1* | 2/2015 | Donaldson | H04S 7/303 381/303 |
| 2015/0181360 A1* | 6/2015 | Dokmanic | G01S 15/46 381/58 |
| 2016/0127827 A1* | 5/2016 | Tzirkel-Hancock | H04R 3/002 381/71.4 |

FOREIGN PATENT DOCUMENTS

WO 2009012499 A1 1/2009
WO 2014036121 A1 3/2014

OTHER PUBLICATIONS

Second Written Opinion from corresponding PCT Application Serial No. PCT/US2016/020282 dated Jan. 3, 2017 (5 pages).
International Preliminary Report on Patentability from corresponding PCT Application Serial No. PCT/US2016/020282 dated Jun. 29, 2017 (18 pages).

* cited by examiner

CALIBRATION OF ACOUSTIC ECHO CANCELATION FOR MULTI-CHANNEL SOUND IN DYNAMIC ACOUSTIC ENVIRONMENTS

BACKGROUND

Multi-channel sound (MCS), such as stereo sound, surround sound, 3D sound, various polyphonic (e.g., octophonic) sound arrangements, ambiosonics, ambiophonics, etc., refers to any of various techniques for enriching sound reproduction quality of an audio source using multiple discrete audio channels routed to an array of loudspeakers operating in a coordinated fashion to encompass one or more listeners with differentiated sound signals from multiple directions. In the context of MCS systems, "echo" results from any condition by which a specific sound emitting from different loudspeakers travels different paths and reaches a listener at different times, thereby creating a duplicative, repeating, or "fuzzy" sound effect. For a multi-loudspeaker system, each loudspeaker can effectively contribute to echo effect because the sound produced by each loudspeaker will, to some extent, travel a unique acoustic path before reaching the ear of the listener.

To compensate for the echo effect, an MCS system may actively learn the acoustic paths from each of the loudspeakers with respect to a specific target listening location found within the acoustic environment. This active approach may comprise a calibration mode that produces one or more test sounds at each loudspeaker individually, measures these sounds using one or more microphones, and determines the learned acoustic path for each such loudspeaker with respect to the target listening location. However, a shortcoming of this approach is that the "calibration" performed by the MCS system is most applicable only to the specific characteristics of the acoustic environment at the time the calibration is performed, and thus works well for static (i.e., non-changing) acoustic environments. For acoustic environments with dynamic (i.e., changing) characteristics, the calibration may not be helpful and, in certain instances, may even contribute to (instead of diminish) echo effects.

SUMMARY

Various implementations disclosed herein are directed to calibrating acoustic echo cancellation in a multi-channel sound system by determining a scene from an acoustic environment, identifying a predetermined scene from among a plurality of predetermined scenes that best matches the scene, wherein each predetermined scene from among the plurality of predetermined scenes corresponds to a pre-tuned filter configuration, and calibrating the multi-channel sound system using the pre-tuned filter configuration corresponding to the identified predetermined scene.

Several implementations feature detecting a change to the acoustic environment, wherein for certain implementations the change is quantified and determined to meet a threshold as a condition for calibrating the multi-channel sound system. For some implementations, determining the scene from the acoustic environment is responsive to detecting the change to the acoustic environment, while for other implementations detecting the change to the acoustic environment is based on the scene determined from the acoustic environment. For select implementations, the predetermined scene that best matches the scene may also be quantified based on the closeness of the match to determine whether the closeness of the match meets a minimum threshold as a condition for calibrating the multi-channel sound system.

The various implementations disclosed herein may be used in a variety of acoustic environments including but not limited to a room or an interior of a vehicle. Moreover, for certain implementations, the plurality of predetermined scenes may be stored locally or stored remotely and accessible via a communications connection. Determining a scene may be performed by a camera-based sensor, and/or performed by a borrowed sensor.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Multi-channel sound (MCS), such as stereo sound, surround sound, 3D sound, various polyphonic (e.g., octophonic) sound arrangements, ambiosonics, ambiophonics, etc., refers to any of various techniques for enriching sound reproduction quality of an audio source using multiple discrete audio channels routed to an array of loudspeakers operating in a coordinated fashion to encompass one or more listeners with differentiated sound signals from multiple directions. MCS is generally characterized by a target listening location (TLL) or "sweet spot" where the audio effects are optimal and presents a fixed forward perspective of the sound field to the listener at this location. MCS techniques enhance the perception of sound spatialization by exploiting sound localization with regard to the ability of a listener to identify the location or origin of a detected sound in terms of direction and distance. Various MCS formats and techniques are available and vary in recording methods, sound reproduction, and the number and positioning of the multiple discrete audio channels.

Figure 1:
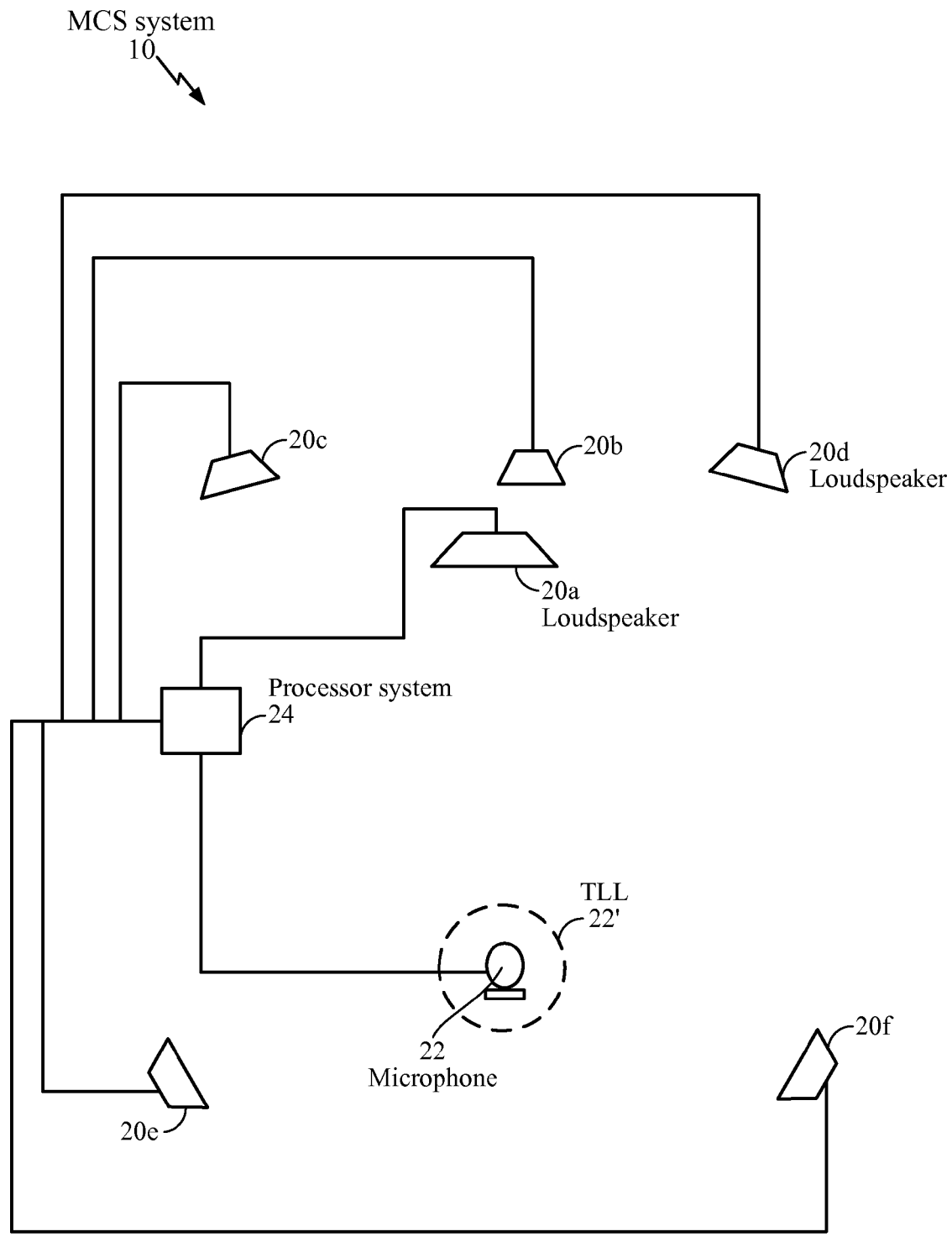
FIG. 1 is a block diagram illustrating an exemplary multi-channel sound (MCS) system to which various implementations may be applied.

FIG. 1 is a block diagram illustrating an exemplary MCS system 10 to which various implementations disclosed herein may be applied. A plurality of loudspeakers 20a-20f and a microphone 22 are operatively coupled to a processor system 24. The microphone 22 may be positioned at the TLL or "sweet spot" 22' for the MCS corresponding to where listeners are expected to locate within the acoustic environment and for which the system is configured for optimum performance of a listener in that location. As illustrated, the loudspeakers 20a-20f are arranged to provide what is known to skilled artisans as "5.1 Surround Sound," although this is just one example and the various implementations disclosed herein are not limited to this configuration but, instead, may encompass any of several different configurations comprising the same or a different number of speakers without limit.

Figure 2:
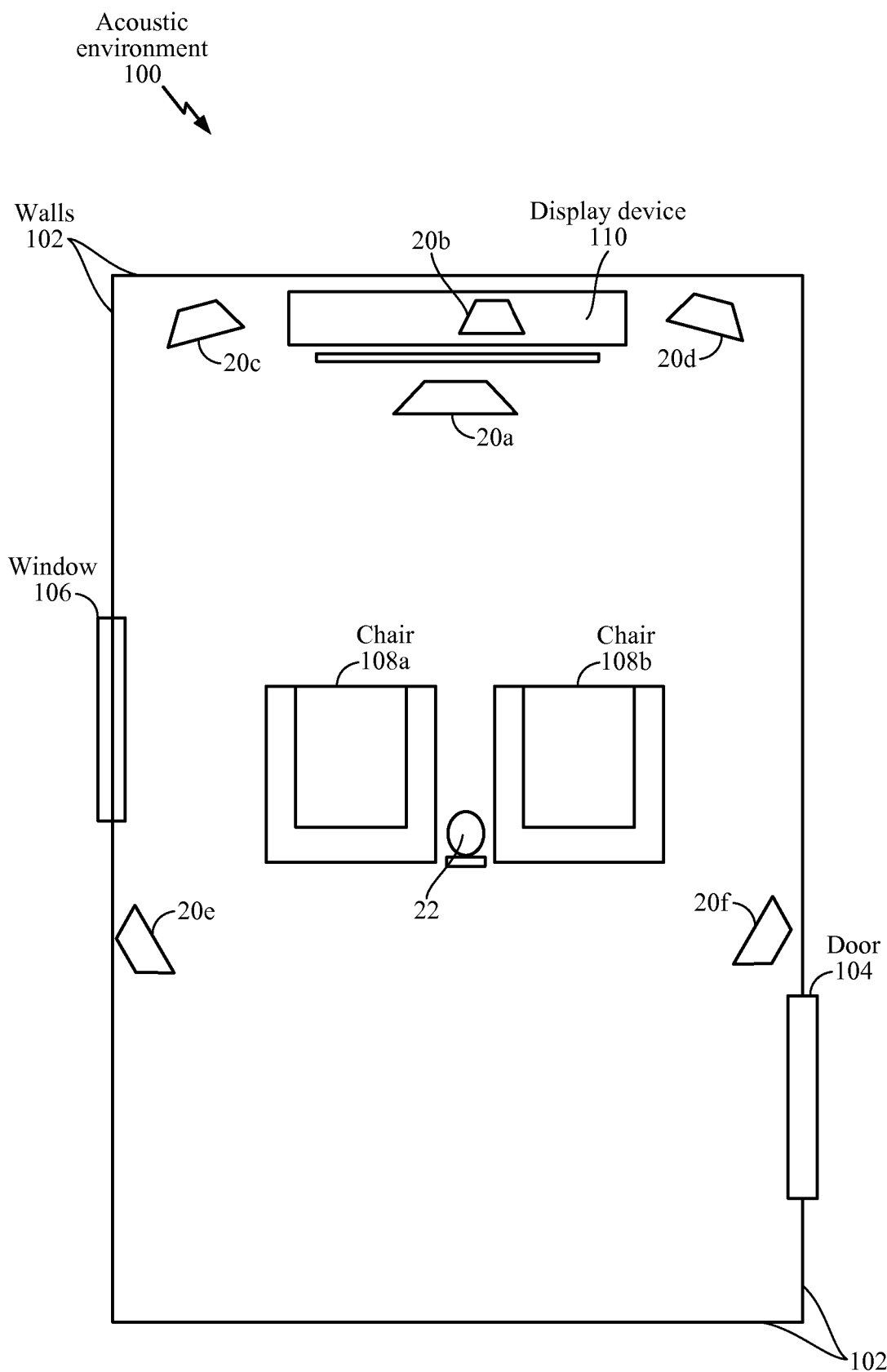
FIG. 2 is a block diagram illustrating the exemplary MCS system of FIG. 1 operating in an acoustic environment to which various implementations may be utilized.

FIG. 2 is a block diagram illustrating the exemplary MCS system 10 of FIG. 1 operating in an acoustic environment 100, in this instance a room, for which various implementations disclosed herein may be utilized. In addition to the various components of the MCS system, the acoustic environment 100 may also comprise walls 102, a door 104, a window 106, chairs 108a and 108b, and a display device 110, among other things, that impact the acoustic characteristics of the acoustic environment and may contribute to echo effects.

In the context of MCS systems, "echo" results from any condition by which a sound emitting from different loudspeakers travels different paths and reaches a listener at different times, thereby creating a duplicative, repeating, or "fuzzy" sound effect. For a multi-loudspeaker system, each loudspeaker can contribute to echo effect because the sound produced by each loudspeaker will, to some extent, travel a different acoustic path before reaching the ear of the listener. Moreover, for various MCS systems that might employ multiple microphones (for any of a variety of purposes), these various microphones may partially detect the sounds produced by one or more loudspeakers and inadvertently reproduce them at one or more loudspeakers in a manner that further enhances the echo effect.

To compensate for the echo effect, an MCS system may actively learn the acoustic paths from each of the loudspeakers with respect to a specific target listening location (e.g., the microphone 22 of FIG. 1) found within the acoustic environment 100. This active approach may comprise a calibration mode that produces one or more test sounds at each loudspeaker (e.g., loudspeakers 20a-20f) individually, measures these sounds using one or more microphones (e.g., microphone 22), and determines the learned acoustic path for each such loudspeaker with respect to the target listening location. The MCS can then create a mono-far-end reference signal by mixing the individual test sound signals using the learned acoustic paths. This mono-far-end reference signal can be used to cancel the echo by appropriately modifying (delaying, quieting, etc.) the sound signals produced by each loudspeaker using filters that are "fixed" (i.e., pre-configured, hence "fixed filters") to cancel the echo.

However, one shortcoming of this approach is that the "calibration" performed by the MCS system is most applicable only to the specific characteristics of the acoustic environment at the time the calibration is performed, and thus works well for static (i.e., non-changing) acoustic environments. In contrast, for acoustic environments with dynamic (i.e., changing) characteristics the calibration may not be helpful and, in certain instances, may even contribute to (instead of diminish) echo effects.

Many acoustic environments are not fixed or static but instead are dynamic where the acoustics of the environment are constantly changing. For example, for certain dynamic acoustic environments, such as a room, an interior or cabin of a vehicle (e.g., an automobile), or other defined space, the acoustics may change when persons enter, leave, or move about the environment, as well as when windows or doors are opened or closed, furniture is moved or rearranged, etc. Opening a door, for example, can greatly impact the acoustics of a room by introducing an acoustic surface of infinite absorption (where sound waves cease to reflect over the surface of the door) into the acoustic environment, as well as introduce secondary effects from the space beyond the open door.

Figure 3A:
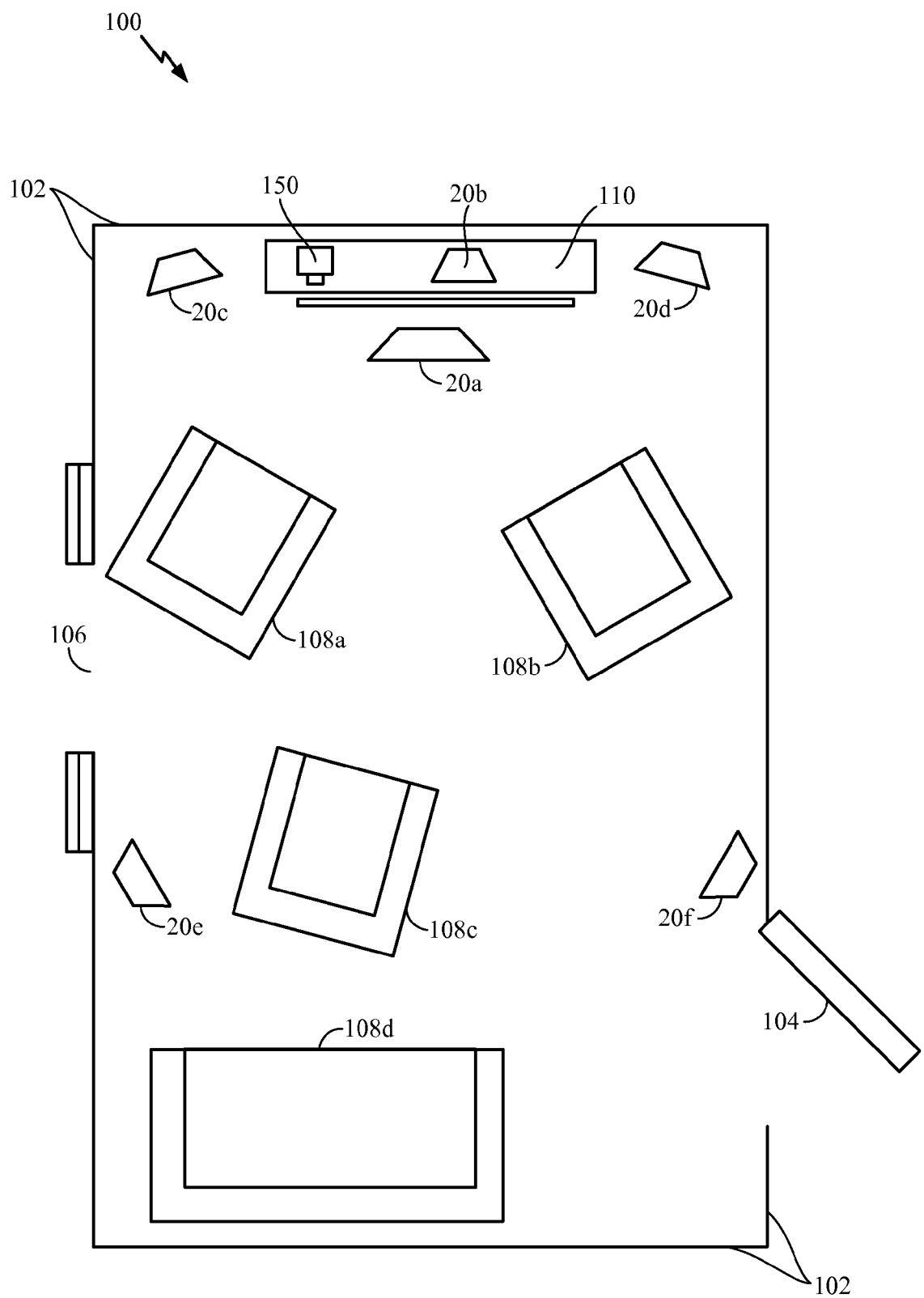
FIG. 3A is a block diagram corresponding to the acoustic environment of FIG. 2 where the configuration of the acoustic environment has been changed.

FIG. 3A is a block diagram corresponding to the acoustic environment 100 of FIG. 2 but wherein the configuration of the acoustic has been changed. Specifically, in the Figure, the chairs 108a and 108b have been moved, chairs 108c-108d have been added, and the door 104 and the window 106 have been opened. The acoustic environment 100 also includes a digital camera 150 that may be used as a sensor to detect and identify changes in the acoustic environment 100. Accordingly, the acoustic characteristics of the acoustic environment illustrated in FIG. 3A are changed and now different from the acoustic characteristics of the acoustic environment illustrated in FIG. 2.

Figure 3B:
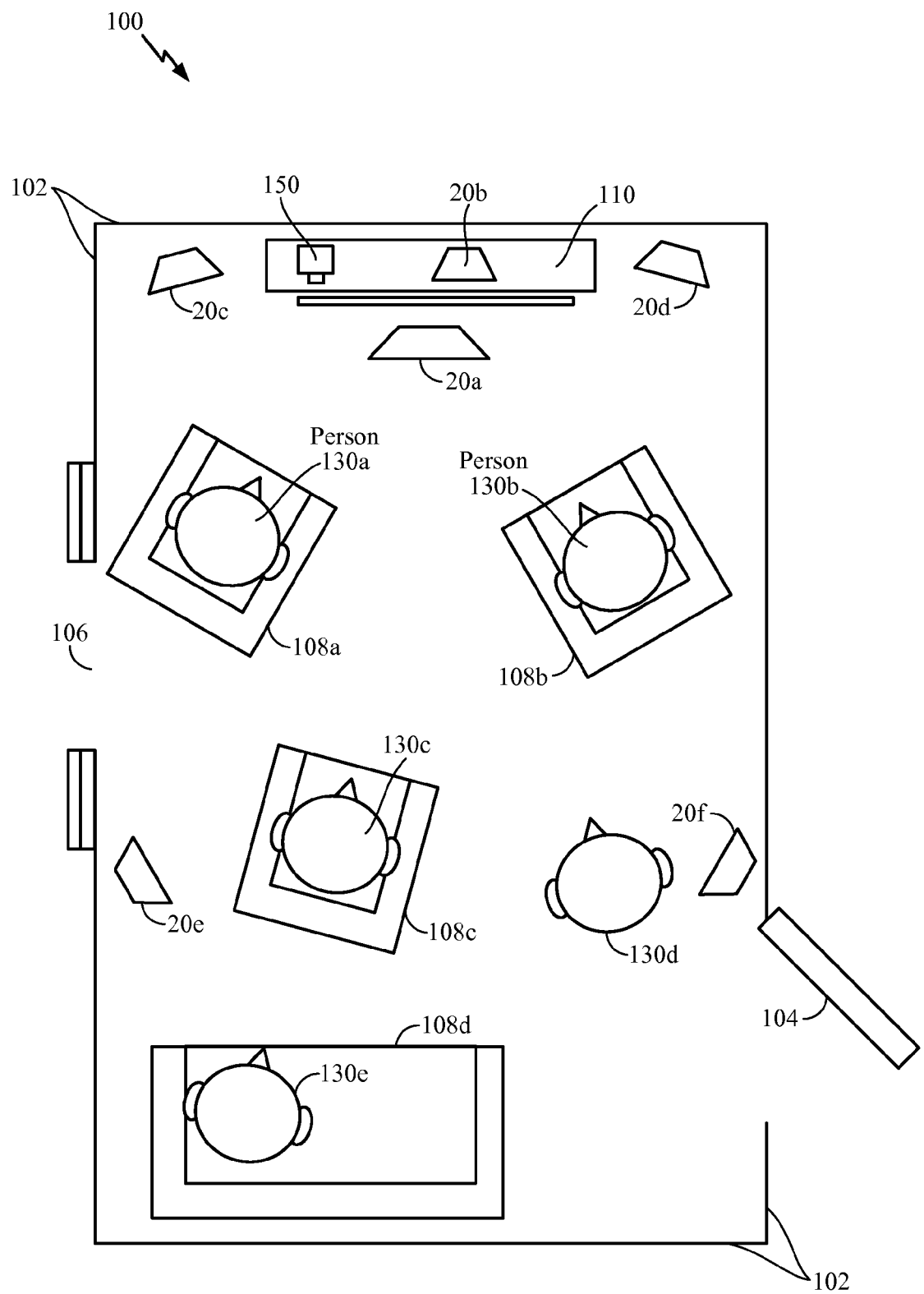
FIG. 3B is a block diagram corresponding to the acoustic environment of FIGS. 2 and 3 and further including persons variously standing or sitting in the room as illustrated.

FIG. 3B is a block diagram corresponding to the acoustic environment 100 of FIGS. 2 and 3A and further including persons 130a-130e variously standing, sitting in chairs, or even sitting on the floor. The acoustic environment 100 also includes digital camera 150 that may be used as a sensor to detect and identify changes in the acoustic environment 100. Accordingly, the acoustic characteristics of the acoustic environment illustrated in FIG. 3B is changed and now different from the acoustic characteristics of the acoustic environment as illustrated in FIG. 2 and FIG. 3A because of the addition of new acoustic surface (i.e., the persons 130a-130e) and because the TLL "sweet spot" might no longer exist (as shown) or may have changed based on where the persons 130a-130e are individually and collectively located within the acoustic environment.

Figure 4:
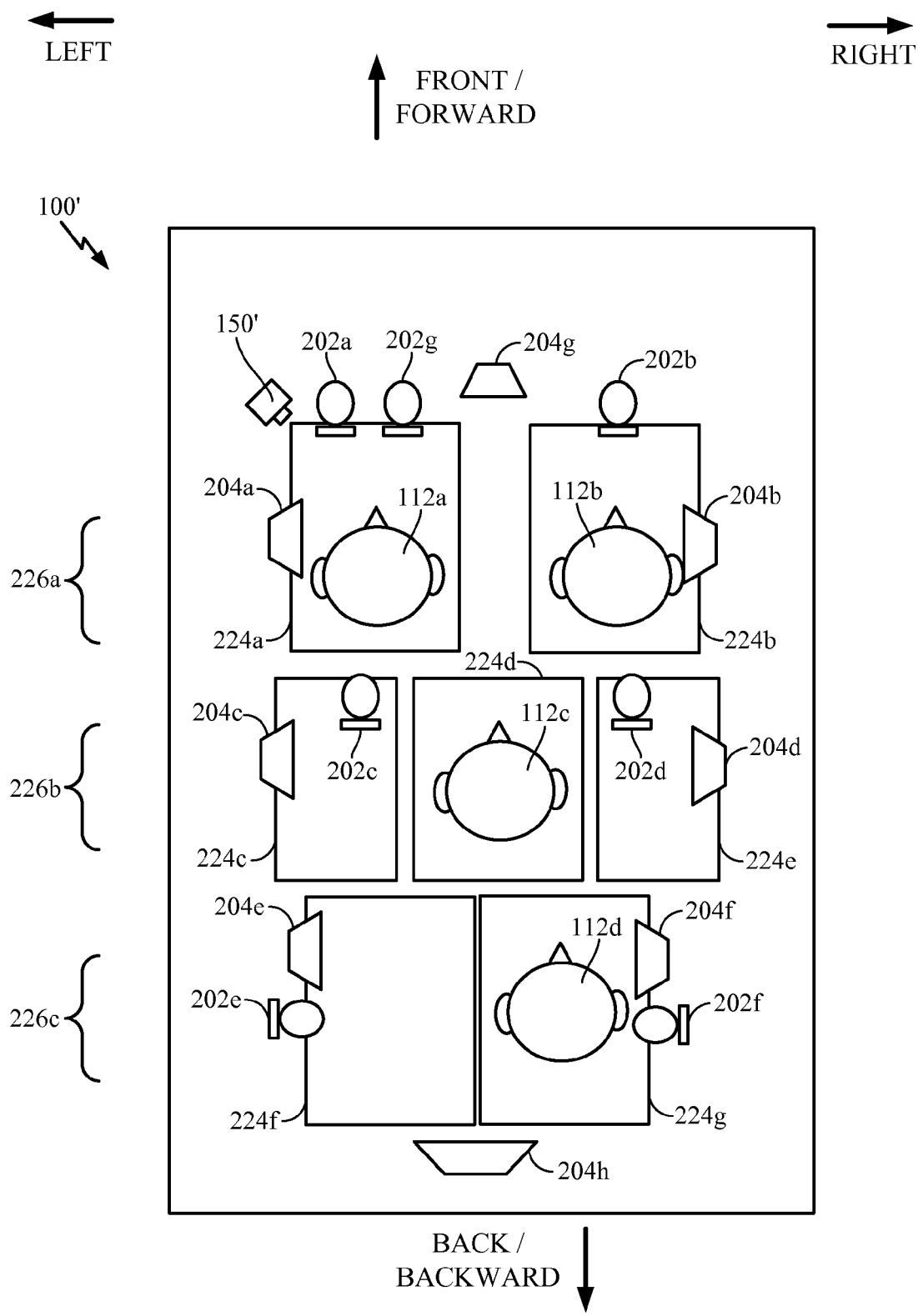
FIG. 4 is a block diagram of an alternative acoustic environment corresponding to the interior of a vehicle for which various implementations herein provided may be utilized.

FIG. 4 is a block diagram of an alternative acoustic environment 100' corresponding to the interior of a vehicle for which various implementations herein provided may be utilized. In FIG. 4, a plurality of loudspeakers 204a-204h for providing sound signals and a plurality of microphones 202a-202g for capturing sound signals are incorporated in the MCS system, although this is exemplary only and various other configurations are also contemplated. Several passengers 112a-112d occupy a subset of the plurality of seats 224a-224g arranged in three rows 226a-226c. The interior of the vehicle may be further augmented with a digital camera 150', similar to the digital camera 150 illustrated in FIGS. 3A and 3B, for example, and may be used as a sensor to detect and identify changes in the acoustic environment 100'. The acoustic environment 100' for an interior of a vehicle may be more static than the acoustic environment 100 for a room of FIGS. 2, 3A, and 3B, where the changes to the acoustic environment may be largely based on the number of passengers and the specific seats those passengers occupy.

Regardless of the type of acoustic environments, however, as an acoustic environment changes, the fixed filters derived during the calibration operation are unable to achieve optimal performance and instead the result is degraded sound quality within the acoustic environment, i.e., sound-based presentations such as music, movie audio, and other audio playback sources can be negatively impacted.

Accordingly, a dynamic acoustic environment would benefit from a more dynamic form of echo cancellation in order to compensate for changing echo effects. To this end, various implementations disclosed herein are directed to calibrating echo cancellation in response to a change in the acoustic environment.

As will be appreciated by skilled artisans, dynamic acoustic echo cancellation (AEC) may be achieved in single-channel implementations (featuring a single acoustic source) using adaptive filters. One approach for this type of adaptive filtering is to capture a corrupted sound signal (i.e., a sound signal comprising an echo) as the primary input and subtract from it the corresponding uncorrupted sound signal (i.e., having no echo) captured as a reference input (and usually captured at the source of the sound signal). The resulting difference is the echo component by which the filter is then adapted real-time for the purpose of subtracting this echo component from the primary input to generate a corrected output.

However, adaptive filters do not operate well when multiple acoustic sources are present because multiple acoustic sources result in multiple reference inputs which are difficult to synthesize real-time into the difference that is subtracted from the primary signal by the adaptive filter. Moreover, this difficulty can be exacerbated by the adaptive filtering being performed for each speaker effectively becoming an updated reference input to all of the other adaptive filters and will in turn impact the adaptive filtering occurring at every other speaker recursively. Accordingly, for acoustic environments featuring multiple acoustic sources, including MCS implementations, typical dynamic filtering is not desirable and AEC is instead performed using fixed filters that are generally derived during a calibration mode of the MCS system prior to its intended use albeit with the shortcomings that apply to dynamic acoustic environments (as described above).

To address these shortcomings, various implementations disclosed herein are directed to intelligent calibration of acoustic echo cancellation for multi-channel sound systems used in dynamic acoustic environments. For several such implementations, a sensor subsystem is utilized to detect and identify changes in the acoustic environment using one or more acoustic and/or non-acoustic sensors (e.g., computer vision, for example). Digital camera 150 illustrated in FIGS. 3A and 3B, for example, may be used as a sensor to detect and identify changes in the acoustic environment 100.

For several implementations, the sensors of the MCS system are used to detect that a change in the acoustic environment has occurred and determine a scene corresponding to the resulting acoustic characteristics for that environment. This detected scene is compared to one or more predetermined scenes corresponding to the acoustic environment. Each predetermined scene has a corresponding pre-tuned filter configuration for optimal AEC performance. Based on the results of the comparison, the pre-tuned filter configuration corresponding to the predetermined scene that most closely matches the detected scene is utilized by the AEC subsystem of the MCS system.

For certain implementations, the scene may be determined as part of the change detecting process, while for other implementations the scene may be determined after a change is detected by different means.

For certain implementations, the predetermined scene and/or the pre-tuned filter configuration may be stored (and accessed) locally, and/or may constitute entries in a database, for example. For certain other implementations, the predetermined scene and/or the pre-tuned filter configuration may be stored remotely and accessed through a communications connection such as, for example, via the Internet or via a wireless telecommunications connection.

Figure 5:
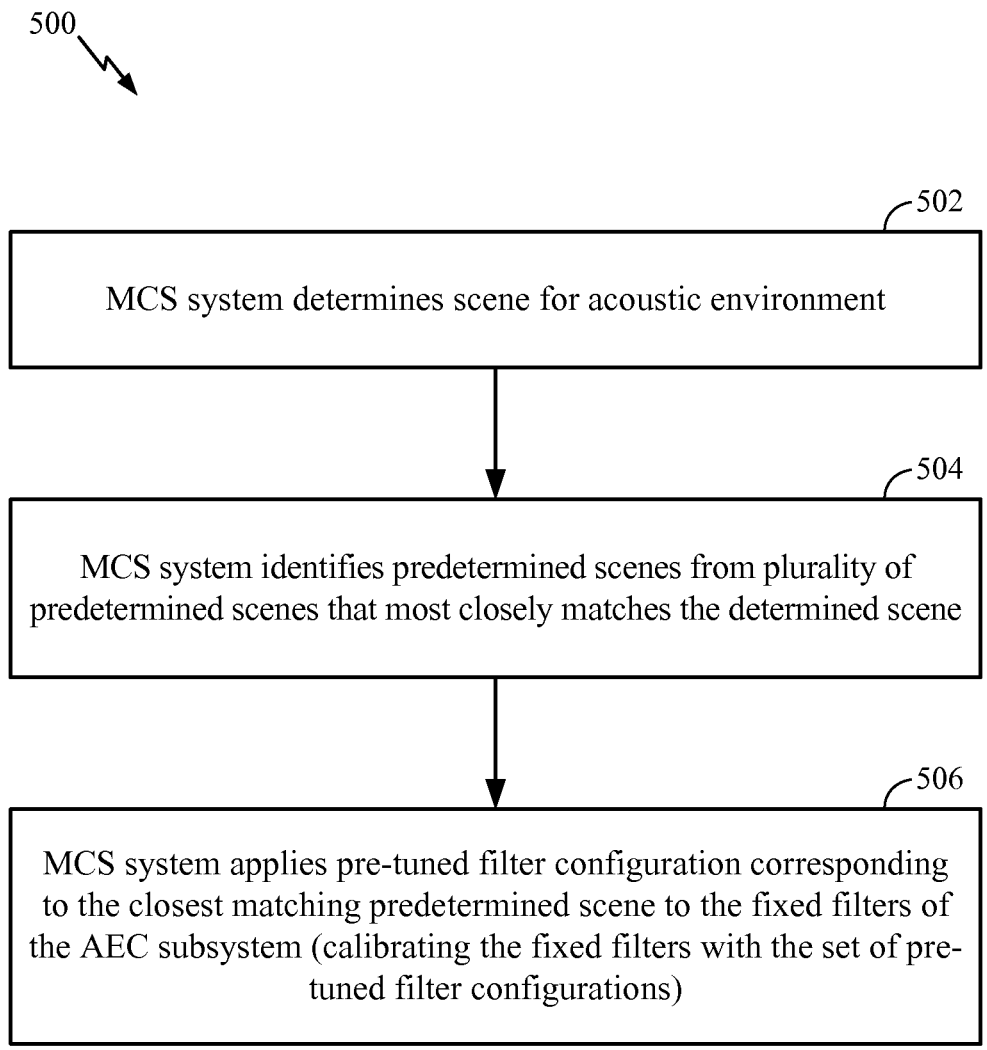
FIG. 5 is a process flow diagram illustrating an exemplary method, representative of various implementations herein disclosed, for calibrating and/or recalibrating acoustic echo cancellation for multi-channel sound in a dynamic acoustic environment.

FIG. 5 is a process flow diagram illustrating an exemplary method 500, representative of various implementations herein disclosed, for calibrating and/or recalibrating acoustic echo cancellation for multi-channel sound in a dynamic acoustic environment.

In FIG. 5, the method 500 begins at block 502 with the MCS system determining a scene for the acoustic environment, the scene comprising acoustic characteristics of the acoustic environment as detected by one or more sensors of the MCS system.

At block 504, the determined scene is compared to a plurality of predetermined scenes accessible to the MCS system to identify a closest match to the determined scene, wherein each predetermined scene corresponds to a pre-tuned filter configuration that is also accessible to the MCS.

At block 506, the pre-tuned filter configuration corresponding to the closest matching predetermined scene is applied to the fixed filters of the AEC subsystem of the MCS system to calibrate the fixed filters with the set of pre-tuned filter configurations.

For certain implementations, the MCS may determine an initial scene for the initial calibration of the MCS system using known means (e.g., based on the location of the microphone 22 corresponding to the desired TLL "sweet spot" 22' as discussed earlier herein). This initial scene then becomes the reference scene for later determining if changes to the acoustic environment (based on a subsequently determined scene) necessitate a change in fixed filters used by the AEC subsystem. Then, when a change occurs in the fixed filters used by the AEC subsystem, the latter determined scene resulting in the change may become the new reference scene against which subsequently determined scenes are compared.

It should be noted that calibrating the fixed filters responsive to a change in the acoustic environment may have a variety of different effects including but not limited to (1) moving the TLL "sweet spot" from one location to another within the acoustic environment; (2) enlarging (but diminishing) the TLL "sweet spot" within the acoustic environment; or (3) enhancing the acoustic quality for select portions of the acoustic environment at the cost of degrading acoustic quality for other portions of the acoustic environment.

Figure 6:
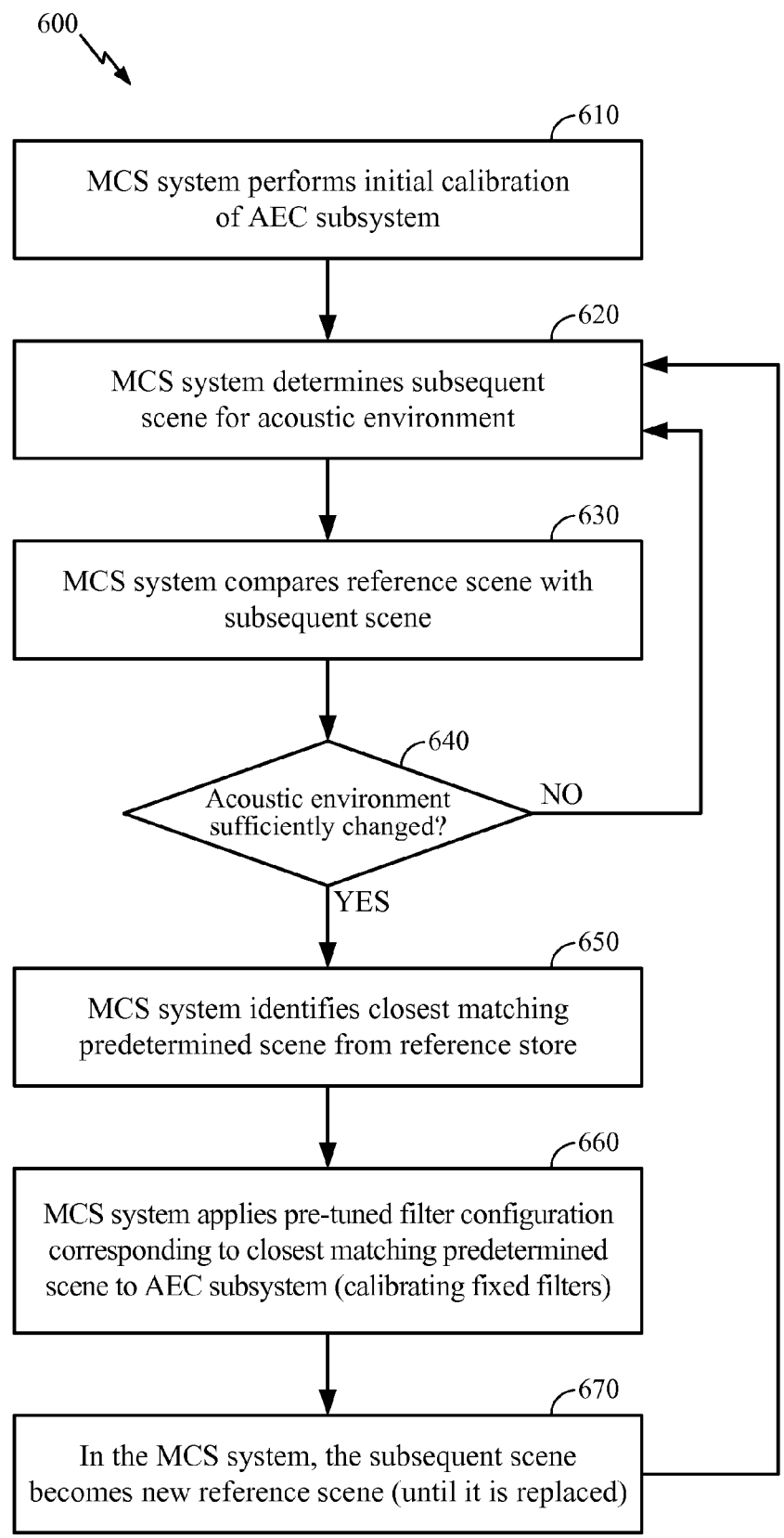
FIG. 6 is a process flow diagram illustrating an alternative exemplary method for calibrating and/or recalibrating acoustic echo cancellation for multi-channel sound in a dynamic acoustic environment representative of several implementations disclosed herein.

FIG. 6 is a process flow diagram illustrating an alternative exemplary method 600 for calibrating and/or recalibrating acoustic echo cancellation for multi-channel sound in a dynamic acoustic environment representative of several implementations disclosed herein.

In FIG. 6, the method 600 begins at block 610 with the MCS system performing an initial calibration of the AEC subsystem (and fixed filters) including determining an initial scene corresponding to this initial calibration as the first reference scene. At block 620, the MCS system determines a subsequent scene for the acoustic environment. At block 630, the MCS system compares the reference scene with the subsequent scene.

At block 640, the MCS determines whether the acoustic environment has sufficiently changed based on the comparison in block 630. If the acoustic environment has not sufficiently changed, then the process returns to block 620 for iterative operation. If the acoustic environment has sufficiently changed, however, the process continues to block 650 where the MCS system identifies the closest matching predetermined scene from a reference store for storing a plurality of predetermined scenes (e.g., a library or database) that may be either locally or remotely maintained. Once the closest matching predetermined scene has been identified, at block 660 a pre-tuned filter configuration corresponding to the closest matching predetermined scene (which may also be included in the same reference store) is applied to the AEC subsystem to update the fixed filters with new settings, and at block 670 the subsequent scene becomes the reference scene until it is itself subsequently replaced. The process returns to block 620 for continued iterative operation.

For certain implementations, the initial scene determined in block 610 of FIG. 6, along with the corresponding AEC fixed filter setting, may be stored in the reference store for the plurality of predetermined scenes as a first entry or a subsequent entry. Likewise, for any subsequent calibration of the MCS system using known means (e.g., based on the location of the microphone 22 corresponding to the desired TLL "sweet spot" 22' as discussed earlier herein), whether manually or automatically initiated, can result in a determined scene and corresponding AEC settings for storage in the reference store. Moreover, for certain implementations a reference store may be pre-populated with one or more generic or default scenes (and corresponding settings) for typical acoustic environments to provide a default universal subset for comparison purposes.

With regard to whether an acoustic environment has sufficiently changed, and for several implementations herein disclosed, the determined change may be quantified and compared to a minimum threshold such that the MCS system is not updated when the change is less than the threshold and the MCS system is updated when the change is equal to or more than a threshold, or variations thereof.

Likewise, for yet other implementations, when the acoustic environment has been sufficiently changed, the match between the closest predetermined scene and the determined scene might also be quantified and evaluated against a threshold to determine whether to update the MCS system (for a good match), to not update the MCS system (for a bad match), or take an alternative action. For some such implementations, the alternative action may be one of automatically performing a typical calibration for the changed acoustic environment, notifying a user of the desirability of performing a (manual) typical calibration, performing a partial calibration, returning to a default or previous state, determining new fixed filter settings for the AEC subsystem by some other means, and so forth.

For example, when any variation in the acoustic environment is detected, the MCS system may run one or more tests of specific signal characteristics of the acoustic environment to determine whether to proceed with a calibration via any of the various implementations disclosed herein. Such tests may include, for example, a determination of the sparseness of modeled acoustic environment response within an echo cancellation adaptive filter and/or a measure of echo suppression (i.e., Echo Return Loss Enhancement or ERLE) provided by a linear echo canceller or other source. However, skilled artisans will appreciate that neither of these two tests by themselves may be sufficient to accurately measure and estimate a need for calibration. For instance, when a person moves to stand directly in front of a camera-type sensor, the observed change does not necessarily indicate a change in the acoustic environment and thus should be identified when they occur, and excluded to prevent false positives. Likewise, auditory signal characteristics alone might also be unreliable in certain contexts such as during the occurrence of double-talk and should likewise be excluded when identified.

In FIG. 6, and for select configurations, determining a subsequent scene for the acoustic environment may be preceded by a minimum wait time, MCS system usage time, or other trigger event in order to delay immediate operation of this element. However, other configurations, such as that shown in FIG. 6, may iteratively determine subsequent scenes without delay to immediately detect changes in the acoustic environment and proceed accordingly to provide real-time dynamic calibration.

For some implementations, the closest predetermined scene may need to meet a minimum threshold of similarity for application of its corresponding pre-tuned filter configuration. For such implementations, when the detected scene does not meet this threshold, the system may instead choose to perform a new real-time calibration, may utilize a default configuration (or one default configuration from among a plurality of default configurations selected based on a determinable criteria), or may continue to use the last configuration as is.

The various implementations disclosed herein may also be utilized in a variety of acoustic environments and contexts including but not limited to home theater, interior of a vehicle, and other defined acoustic environments. Within each such acoustic environment, different scenes may be determinable for different configurations of persons which may be finite (such as in the case of an interior of a vehicle having predefined locations, orientations, and numbers based on the arrangement of seats provided) to theoretically infinite (such as in the case of a large room capable of holding several people in various locations and innumerable orientations). Moreover, in the context of an interior of a vehicle as the acoustic environment, specific implementations may utilize a reference store specifically pre-populated with one or more generic or default scenes (and corresponding settings) based on the limited number of seats (and finite and determinable seating configurations possible).

The various implementations disclosed herein may also use one or more sensors to determine a scene for the acoustic environment. These sensors may be acoustic (such as a microphone that might otherwise be used for typical calibration operations discussed earlier herein) and/or non-acoustic. For instance, the MCS might use a camera (or computer vision or any other image capture device of any kind whatsoever) to determine changes in the acoustic environment by any of several approaches such as when more than a threshold percentage of the pixels change as a function of time (which would occur when a person walks into room, a door opens, etc.). Then, responsive to the motion coupled with learning/training previously conducted by the MCS system, the MCS system can determine a scene (which may be based on the digital input itself) and modify the AEC to match a closest-match predetermined scene.

Similar alternative implementations are also contemplated for utilization in conjunction with gaming systems, home security systems, and so forth that can provide to the MCS one or more borrowed sensors (e.g., one or more sensors separate from the MCS). For example, a home entertainment video gaming system may comprise a motion sensing input device (e.g., a camera and/or a structured light sensor) that enables users to control and interact with the system without the need to touch a physical game controller. This same motion sensing input device could also be leveraged by an MCS system as a sensor (along or in combination with other sensors) to improve the audio experience when the user is doing other activities such as, for example, watching a movie. The same applies to cameras used for home security and other video (and other sensory) sources that can likewise provide the MCS system with one or more sensors that are not native to the MCS system (but, instead, are borrowed).

For certain implementations, specified objects within an acoustic environment might be identified and tracked such that it is the movement of these objects that is alone used or given different weightings when used to determine a change to the acoustic environment and/or the best match between a determined scene and a predetermined scene. Conversely, other objects (such as human, pets, etc.) can also be specifically identified to varying degrees and increased or decreased in weighting for the aforementioned determinations accordingly. For example, detection of pets might be purposefully ignored so that the acoustics of the environment are not adjusted due to their movements.

Figure 7:
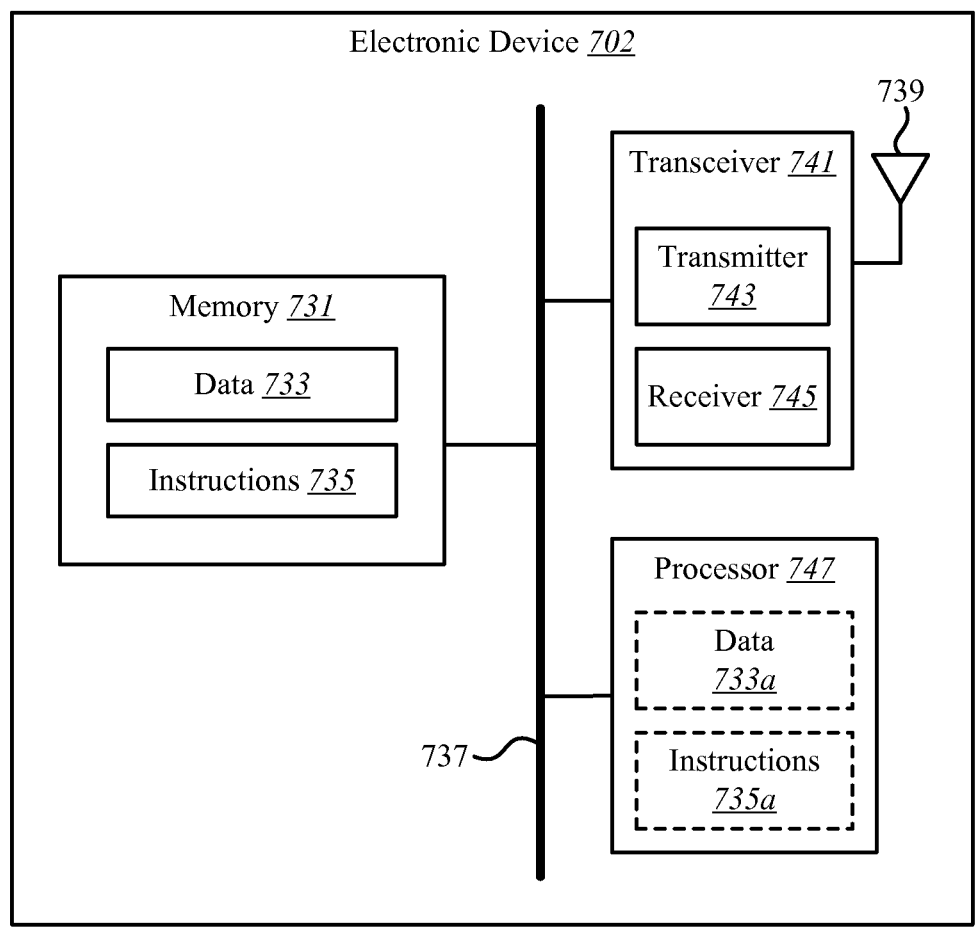
FIG. 7 illustrates certain components that may be included within an electronic device for implementing various implementations disclosed herein.

FIG. 7 illustrates certain components that may be included within an electronic device 702 for implementing various implementations disclosed herein. The electronic device 702 described in connection with FIG. 7 may be an example of and/or may be implemented in accordance with one or more of the electronic devices described herein.

The electronic device 702 includes a processor 747. The processor 747 may be a general purpose single- or multi-chip microprocessor (e.g., an ARM), a special purpose microprocessor (e.g., a digital signal processor (DSP)), a microcontroller, a programmable gate array, etc. The processor 747 may be referred to as a central processing unit (CPU). Although just a single processor 747 is shown in the electronic device 702 of FIG. 7, in an alternative configuration, a combination of processors (e.g., an ARM and DSP) could be used.

The electronic device 702 also includes memory 731 in electronic communication with the processor 747 (i.e., the processor 747 can read information from and/or write information to the memory 731). The memory 731 may be any electronic component capable of storing electronic information. The memory 731 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 733 and instructions 735 may be stored in the memory 731. The instructions 735 may include one or more programs, routines, sub-routines, functions, procedures, code, etc. The instructions 735 may include a single computer-readable statement or many computer-readable statements. The instructions 735 may be executable by the processor 747 to implement one or more of the methods described above. Executing the instructions 735 may involve the use of the data 733 that is stored in the memory 731. FIG. 7 shows some instructions 735a and data 733a being loaded into the processor 747.

The electronic device 702 may also include a transmitter 743 and a receiver 745 to allow transmission and reception of signals between the electronic device 702 and a remote location (e.g., a base station). The transmitter 743 and receiver 745 may be collectively referred to as a transceiver 741. An antenna 739 may be electrically coupled to the transceiver 741. The electronic device 702 may also include (not shown) multiple transmitters, multiple receivers, multiple transceivers and/or multiple antenna.

The various components of the electronic device 702 may be coupled together by one or more buses, which may include a power bus, a control signal bus, a status signal bus, a data bus, etc. For simplicity, the various buses are illustrated in FIG. 7 as a bus system 737.

As used herein, the terms "calibrating" and "calibration" (and various other forms thereof) shall include, but is not limited to, any recalibrating/recalibration of an environment that has been previously calibrated. Likewise, as used herein, the term camera, video, image capture, and so forth shall include any image capture device.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." References to a "location" of a speaker indicates the location of the center of an acoustic-generating face of that speaker unless otherwise indicated by the context. The term "channel" is used at times to indicate a signal path and at other times to indicate a signal carried by such a path, according to the particular context.

Furthermore, unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one, whereas the term "subset" is used herein to indicate an integer quantity that is greater than or equal to one.

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. Moreover, the phrase "based on" does not mean "based only on," unless expressly specified otherwise. In other words, the phrase "based on" describes both "based only on" and "based at least on."

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular figure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of the implementations of the methods described with respect to the various Figures, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into nonvolatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed—at least in part—by a portable communications device such as a handset, headset, or portable digital assistant (PDA), and that the various apparatus described herein may be included within such a device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Stated differently, it is to be understood that the claims are not limited to the precise configuration and components illustrated above, and the various modifications, changes and variations may be made in the arrangement, operation and details of the systems, methods, and apparatus described herein without departing from the scope of the claims.

Furthermore, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

What is claimed is:

1. A method for calibrating a multi-channel sound system, the method comprising:

storing a reference scene from an acoustic environment having a reference value, and a plurality of predetermined scenes, wherein each predetermined scene from among the plurality of predetermined scenes corresponds to a pre-tuned filter configuration for acoustic echo cancellation in the respective predetermined scene;

determining a scene from the acoustic environment;

mapping the determined scene to a value;

detecting a change to the acoustic environment, wherein detecting the change includes comparing the reference value of the reference scene from the acoustic environment to the value of the determined scene from the acoustic environment, and quantifying the change between the reference value of the reference scene from the acoustic environment and the value of the determined scene from the acoustic environment;

determining whether the change to the acoustic environment meets a threshold as a condition for calibrating the multi-channel sound system that includes two or more acoustic sources within the acoustic environment and two or more filters configured to modify sound signals produced by each of the two or more acoustic sources for acoustic echo cancellation in the acoustic environment;

based on the change to the acoustic environment meeting the threshold, identifying a predetermined scene from among the plurality of predetermined scenes that best matches the determined scene; and calibrating the multi-channel sound system using the pre-tuned filter configuration corresponding to the identified predetermined scene, wherein calibrating the multi-channel sound system comprises updating the two or more filters of the multi-channel sound system according to the pre-tuned filter configuration.

2. The method of claim 1, wherein detecting the change to the acoustic environment is based on the scene determined from the acoustic environment.

3. The method of claim 1, wherein the threshold comprises a first threshold, and wherein identifying the predetermined scene that best matches the determined scene comprises quantifying a closeness of the match based on a difference between the value of the determined scene and a value of the predetermined scene and determining whether the closeness of the match meets a second threshold as another condition for calibrating the multi-channel sound system.

4. The method of claim 1, wherein the plurality of predetermined scenes is stored locally or stored remotely and accessible via a communications connection.

5. The method of claim 1, wherein the acoustic environment is one of a room or an interior of a vehicle.

6. The method of claim 1, wherein the reference scene comprises an initial scene from the acoustic environment corresponding to an initial calibration of the multi-channel sound system.

7. The method of claim 1, further comprising, after calibration of the multi-channel sound system using the pre-tuned filter configuration corresponding to the predetermined scene identified based on the determined scene from the acoustic environment, setting the determined scene as the reference scene.

8. An apparatus for calibrating a multi-channel sound system, the apparatus comprising:

a memory configured to store a reference scene from an acoustic environment having a reference value, and a plurality of predetermined scenes, wherein each predetermined scene from among the plurality of predetermined scenes corresponds to a pre-tuned filter configuration for acoustic echo cancellation in the respective predetermined scene; and a processor in communication with the memory and configured to:
  determine a scene from the acoustic environment;
  map the determined scene to a value;
  detect a change to the acoustic environment, wherein, to detect the change, the processor is configured to compare the reference value of the reference scene from the acoustic environment to the value of the determined scene from the acoustic environment, and quantify the change between the reference value of the reference scene from the acoustic environment and the value of the determined scene from the acoustic environment;
  determine whether the change to the acoustic environment meets a threshold as a condition for calibrating the multi-channel sound system that includes two or more acoustic sources within the acoustic environment and two or more filters configured to modify sound signals produced by each of the two or more acoustic sources for acoustic echo cancellation in the acoustic environment;
  based on the change to the acoustic environment meeting the threshold, identify a predetermined scene from among the plurality of predetermined scenes that best matches the determined scene; and
  calibrate the multi-channel sound system using the pre-tuned filter configuration corresponding to the identified predetermined scene, wherein, to calibrate the multi-channel sound system, the processor is configured to update the two or more filters of the multi-channel sound system according to the pre-tuned filter configuration.

9. The apparatus of claim 8, wherein the processor is configured to detect the change to the acoustic environment based on the scene the processor determined from the acoustic environment.

10. The apparatus of claim 8, wherein the threshold comprises a first threshold, and wherein, for the predetermined scene that best matches the determined scene, the processor is configured to quantify a closeness of the match based on the value of the determined scene and a value of the predetermined scene and determine whether the closeness of the match meets a second threshold as another condition for the processor to calibrate the multi-channel sound system.

11. The apparatus of claim 8, wherein the processor determines the scene using a sensor included in a device that is different from the apparatus.

12. The apparatus of claim 8, wherein the reference scene comprises an initial scene from the acoustic environment corresponding to an initial calibration of the multi-channel sound system.

13. The apparatus of claim 8, wherein the processor is configured to, after calibration of the multi-channel sound system using the pre-tuned filter configuration corresponding to the predetermined scene identified based on the determined scene from the acoustic environment, set the determined scene as the reference scene.

14. A multi-channel sound system comprising:

means for storing a reference scene from an acoustic environment having a reference value, and a plurality of predetermined scenes, wherein each predetermined scene from among the plurality of predetermined scenes corresponds to a pre-tuned filter configuration for acoustic echo cancellation in the respective predetermined scene;

means for determining a scene from the acoustic environment;

means for mapping the determined scene to a value;

means for detecting a change to the acoustic environment, wherein the detecting means include means for comparing the reference value of the reference scene from the acoustic environment to the value of the determined scene from the acoustic environment, and means for quantifying the change between the reference value of the reference scene from the acoustic environment and the value of the determined scene from the acoustic environment;

means for determining whether the change to the acoustic environment meets a threshold as a condition for calibrating the multi-channel sound system that includes two or more acoustic sources within the acoustic environment and two or more filters configured to modify sound signals produced by each of the two or more acoustic sources for acoustic echo cancellation in the acoustic environment;

means for, based on the change to the acoustic environment meeting the threshold, identifying a predetermined scene from among the plurality of predetermined scenes that best matches the determined scene; and means for calibrating the multi-channel sound system using the pre-tuned filter configuration corresponding to the identified predetermined scene, wherein the calibrating means further comprise means for updating the two or more filters of the multi-channel sound system according to the pre-tuned filter configuration.

15. The system of claim 14, wherein the detecting means is configured to detect the change to the acoustic environment based on the scene determined from the acoustic environment.

16. The system of claim 14, wherein the threshold comprises a first threshold, and wherein, for the predetermined scene that best matches the determined scene, the identifying means is configured to quantify a closeness of the match based on the value of the determined scene and a value of the predetermined scene and determine whether the closeness of the match meets a second threshold as another condition for the calibrating means to calibrate the multi-channel sound system.

17. The system of claim 14, wherein the reference scene comprises an initial scene from the acoustic environment corresponding to an initial calibration of the multi-channel sound system.

18. The system of claim 14, further comprising means for, after calibration of the multi-channel sound system using the pre-tuned filter configuration corresponding to the predetermined scene identified based on the determined scene from the acoustic environment, setting the determined scene as the reference scene.

19. A non-transitory computer readable medium comprising computer-executable instructions that enable calibration of a multi-channel sound system, the computer-executable instructions comprising instructions that cause a processor to:

store a reference scene from an acoustic environment having a reference value, and a plurality of predetermined scenes, wherein each predetermined scene from among the plurality of predetermined scenes corresponds to a pre-tuned filter configuration for acoustic echo cancellation in the respective predetermined scene;

determine a scene from the acoustic environment;
map the determined scene to a value;
detect a change to the acoustic environment, wherein the instructions cause the processor to compare the reference value of the reference scene from the acoustic environment to the value of the determined scene from the acoustic environment, and quantify the change between the reference value of the reference scene from the acoustic environment and the value of the determined scene from the acoustic environment;

determine whether the change to the acoustic environment meets a threshold as a condition for calibrating the multi-channel sound system that includes two or more acoustic sources within the acoustic environment and two or more filters configured to modify sound signals produced by each of the two or more acoustic sources for acoustic echo cancellation in the acoustic environment;

based on the change to the acoustic environment meeting the threshold, identify a predetermined scene from among the plurality of predetermined scenes that best matches the determined scene; and calibrate the multi-channel sound system using the pre-tuned filter configuration corresponding to the identified predetermined scene, wherein the instructions cause the processor to update the two or more filters of the multi-channel sound system according to the pre-tuned filter configuration.

20. The computer readable medium of claim 19, wherein the instructions cause the processor to detect the change to the acoustic environment based on the scene determined from the acoustic environment.

21. The computer readable medium of claim 19, wherein the threshold comprises a first threshold, and wherein the instructions that cause the processor to identify the predetermined scene that best matches the determined scene further comprises instructions that cause the processor to: quantify a closeness of the match based on the value of the determined scene and a value of the predetermined scene; and determine whether the closeness of the match meets a second threshold as another condition for the processor to calibrate the multi-channel sound system.

22. The computer readable medium of claim 19, wherein the processor is included within a first device, further comprising instructions that cause the processor to determine the scene using a sensor included in a second device that is different from the first device.

23. The computer readable medium of claim 19, wherein the reference scene comprises an initial scene from the acoustic environment corresponding to an initial calibration of the multi-channel sound system.

24. The computer readable medium of claim 19, wherein the instructions cause the processor to, after calibration of the multi-channel sound system using the pre-tuned filter configuration corresponding to the predetermined scene identified based on the determined scene from the acoustic environment, set the determined scene as the reference scene.

* * * * *